3,050,462
STABILIZATION OF GLYCOL SOLUTIONS EMPLOYED IN AROMATIC RECOVERY
Philip J. Garner, Hooton, Wirral, England, assignor to Shell Oil Company, a corporation of Delaware
No Drawing. Filed Dec. 30, 1959, Ser. No. 862,761
Claims priority, application Great Britain Jan. 28, 1959
3 Claims. (Cl. 208—323)

The present invention relates to the stabilization of glycols, including polyoxyalkylene glycols and ethers and esters thereof, and is particularly concerned with extraction processes in which such stabilized glycols are used as extractive solvents. Glycol solvents are particularly susceptible to oxidation, and must be guardedly handled to avoid decomposition.

According to the present invention in an extraction process in which the extractive liquid comprises at least one glycol, for example, a polyoxyalkylene glycol or ether or ester thereof, such as diethylene glycol or dipropylene glycol, the extractive liquid has incorporated in it a minor proportion of a phenothiazine or a substituted phenothiazine. Phenothiazine and substituted phenothiazines have been found to be particularly effective oxidation inhibitors, both at high and low temperatures, for the glycol extractive liquids.

Glycolic solvents, either dry or containing some water, are particularly useful in the extraction of aromatic hydrocarbons from petroleum fractions. Air may be unavoidably present in the solvent. Sometimes the most desirable temperatures for extraction and/or for the recovery of the aromatics from the extract phase may go above the temperature at which the particular glycol is stable against oxidation. In these cases it is of considerable advantage to be able to stabilize the glycol against oxidation and in some cases it makes possible considerable savings in the operation of a particular process, by extending the practicable temperature ranges.

The preferred embodiment of the invention therefore provides a process for the extraction of aromatic compounds from a liquid hydrocarbon mixture in which the liquid hydrocarbon mixture is contacted with a glycol or mixture of glycols containing a minor proportion of a phenothiazine or a substituted phenothiazine. The glycol solvent when guarded against oxidation by the phenothiazine may be safely used in an extraction system wherein the extract recovery zone is operating at a subatmospheric pressure. With the practice of the instant process, operation in the presence of some air is permissible. Phenothiazine itself is the preferred material.

The phenothiazine or substituted phenothiazine may be present in any proportion up to the limit of solubility, preferably between 0.05 and 1% by weight. The suitable phenothiazines are diphenylamines, for example, phenothiazine itself and certain nuclear C-substituted derivatives thereof. Each phenyl nucleus is substituted with $n$ polar substituents, where $n$ is an integer from 0 to 1. Each phenyl nucleus may be substituted with 0 to 4 alkyl groups having up to 3 carbon atoms each. The total number of carbon atoms in the alkyl substituents should not exceed 12, and the sum of alkyl substituents and polar substituents on a single ring is no greater than 4. Typical substituted phenothiazines are 2,8-dimethylphenothiazine, 4,7-dihydroxyphenothiazine, 2-aminophenothiazine, 3-aminophenothiazine and 2,8 dimethyl-4-aminophenothiazine.

Particularly desirable phenothiazine materials for use in the process of the invention may be viewed to have the structural formula:

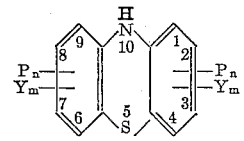

wherein P is a polar radical selected from the group consisting of hydroxyl, amino and halogen radicals, $n$ is an integer from 0 to 1, Y is an alkyl group having up to 3 carbon atoms, the total number of carbon atoms in the substituents not exceeding 12, $m$ is an integer from 0 to 4 and $(m+n)$ is no greater than 4 on a single aromatic ring. The addition of the alkyl groups increases oil solubility, which tendency may be offset through the addition of the hydrophilic polar groups.

The liquid hydrocarbon may have a wide or narrow boiling range. The invention is particularly applicable to processes for separating aromatic hydrocarbons from catalytically reformed gasolines, such as hydroformates and platformates, or fractions thereof. In such processes the extraction zone is normally maintained at an elevated temperature and at a high pressure, thus presenting the solvent in a condition that is particularly susceptible to oxidation if air be present.

An extract phase, consisting of the glycol solvent and dissolved aromatic hydrocarbons, is withdrawn from the extraction zone and passed to a recovery zone which may consist of both a stripping zone and a distillation zone. The stripping zone is usually operated at a pressure slightly lower than that in the extraction zone and at such a temperature that substantially all the non-aromatic hydrocarbons and at least part of the water which may be present, together with some of the glycol solvent and aromatic hydrocarbons, are withdrawn from the top of the stripping zone. The major part of the glycolic solvent and of the aromatic hydrocarbons are withdrawn from the bottom of the stripping zone, and passed to a distillation zone, which is usually operated at a pressure below that of the stripping zone. In some operations, the stripping zone is not used.

In the distillation zone the aromatic hydrocarbons are separated from the glycolic solvent. In view of the rather high boiling points involved, the operation of this distilling zone, when carried out at atmospheric pressure, requires either the use of fairly high bottom temperatures, e.g. 200° C., at which the glycolic solvent rapidly decomposes (even in the absence of air), or the introduction of direct steam at the bottom of the distillation zone at lower temperatures, e.g. 150–160° C., resulting in a high water content of the recovered solvent. On this mixture of recovered solvent and water being recycled to the extraction zone, the water passes into the extract phase and has to be distilled off in the stripping zone, mentioned above. This addition of steam in the distilling zone and its subsequent removal in the stripping zone makes this type of operation, which is characterized by the use of substantially atmospheric pressure in the distilling zone, unattractive from the economic point of view.

The amount of steam required may of course be reduced by applying a sufficiently now subatmospheric pressure in the distilling zone, enabling operation of this zone to take place at such a low temperature that thermal decomposition of the solvent need not be feared.

In theory the pressure might be reduced to such an extent as to render the introduction of steam in the distilling zone redundant. However, these operations at subatmospheric pressures have the drawback that air leaks into the distilling zone, causing oxidative deterioration of the glycolic solvent with consequent corrosion of the equipment by the decomposition products. However, the use of the stabilized glycolic solvents of the present invention enables the glycolic solvent to be separated from the aromatic hydrocarbons at subatmospheric pressures and at temperatures as low as, for instance, 150° C., without any appreciable oxidation of the solvent.

When the feedstock is a fraction from a catalytic reforming process it will preferably have an ASTM final boiling point of not more than 220° C. In the case of reformates the upper cut point should preferably be 160° C. at most, and should advantageously be approximately the same as the upper cut point of the feedstock for the reforming operation. The lower cut point of the feedstock should preferably be about 75° C. or about 100° C.

Preferred solvents used in the present process may be diethylene glycol, triethylene glycol and/or dipropylene glycol, diethylene glycol being particularly preferred. The solvent used in the extraction system may contain a small amount, up to 15% by weight, preferably not exceeding 2% by weight, of water. The present process is particularly applicable to the operation of processes using a dry (that is having a water content of less than 0.1% by weight) solvent.

When carrying out the process according to the invention and using subatmospheric pressure in the distilling zone, the volumetric ratio of solvent to hydrocarbon feed should preferably be between 3:1 and 20:1, and more preferably between 3:1 and 8:1, and the ratio of the amount of top product returned from the stripping zone to the extraction system to the amount of hydrocarbon feed should preferably be between 0.2:1 and 2.5:1, and more preferably between 0.2:1 and 0.7:1.

The extraction system may be a countercurrent multistage extraction system, e.g. a column containing packing material, sieve plates, etc., a so-called rotating disc contactor, a multiplicity of mixer-settler combinations, and the like. The number of theoretical stages should preferably be at least 5. The feed to the extraction system may be introduced at an intermediate point, but it is generally preferred to introduce it near that end of the extraction system at which the extract phase is withdrawn.

The stream of hydrocarbon and solvent that is obtained as top product from the stripping zone in the preferred process (after condensation and after removal of substantially all water separating as a second liquid phase in the condensing operation) is returned to the extraction system, may also be introduced at one or more points near the end of the extraction system.

The temperature in the extraction system is preferably between 80 and 170° C.

The stripping zone is usually operated at a pressure that is lower than that prevailing in the extraction system. The top product contains substantially all the water and non-aromatic hydrocarbons present in the extract phase, and, in addition, some solvent and aromatic hydrocarbons.

The bottom product from the stripping zone, which consists mainly of solvent and aromatic hydrocarbons, is preferably passed to the distilling zone operating below atmospheric pressure, preferably at about 0.2–0.5 atmosphere abs. As mentioned above. Steam may be introduced into the lower part of the distilling zone, if desired, to keep the temperature required to obtain a solvent bottom product susbtantially free of aromatic hydrocarbons as low as possible. Normally, more steam will be added at the higher subatmospheric pressures. At equal pressures, the presence of phenothiazine or a substituted phenothiazine in the solvent will allow the process to be operated at higher temperatures since the presence of phenothiazine or a substituted phenothiazine reduces the oxidative decomposition at any given temperature of the solvent, and therefore requires the use of less steam. This makes the process considerably more economic to operate since it effects large savings in the overall amount of heat used.

The solvent stream is normally recycled to the extraction zone.

In an example of the present process as outlined above the operating conditions are as follows:

| | |
|---|---|
| Temperature in extraction system ° C | 150 |
| Temperature of extract phase on entering stripping zone ° C | 128 |
| Top temperature in stripping zone ° C | 128 |
| Bottom temperature in stripping zone ° C | 175 |
| Top temperature in distilling zone ° C | 85 |
| Bottom temperature in distilling zone ° C | 155 |
| Pressure in extraction system atm | 5 |
| Pressure in stripping zone atm | 1.8 |
| Pressure in distilling zone atm | 0.2 |

Under these conditions the water content of the solvent leaving the distilling column will be about 0.6% by weight.

In another example of the present process the operating conditions are as follows:

| | |
|---|---|
| Temperature in extraction system: | |
| Top ° C | 145 |
| Bottom ° C | 135 |
| Pressure in extraction zone atm | 5 |
| Temperature of extract phase on entering stripping zone ° C | 135 |
| Temperature in stripping zone: | |
| Top ° C | 135 |
| Bottom ° C | 170–175 |
| Pressure in stripping zone atm | 1.5 |
| Temperature in distilling zone: | |
| Top ° C | 85 |
| Bottom °-C | 195 |
| Pressure in distilling zone atm | 0.2 |

Under these conditions the water content of the solvent leaving the distilling column will be below 0.1% by weight.

I claim is my invention:

1. In a liquid-liquid extraction process employing a circulating glycol solvent for the recovery of aromatic materials from a hydrocarbon mixture wherein the aromatic materials are recovered from the solvent in a distillation zone, the improvement comprising incorporating in the solvent a small, oxidation-inhibiting amount of a phenothiazine having the following structure

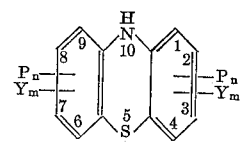

where P is a polar radical selected from the group consisting of hydroxyl, amino and halogen radicals, $n$ is an integer from 0 to 1, Y is an alkyl group having up to 3 carbon atoms, the total number of carbon atoms in the substituents not exceeding 12, $m$ is an integer from 0 to 4 and $(m+n)$ is no greater than 4 on a single aromatic ring, said phenothiazine permitting the operation of the distillation zone at a subatmospheric pressure without the occurrence of excessive solvent of oxidation, and operating the distillation zone at said subatmospheric pressure and a correspondingly reduced temperature.

2. A process in accordance with claim 1 wherein the oxidation inhibiting material is phenothiazine.

3. A process in accordance with claim 1 wherein the phenothiazine is incorporated in the solvent in an amount between 0.5 and 1% based on the weight of the glycol.

References Cited in the file of this patent

UNITED STATES PATENTS

| | | |
|---|---|---|
| 2,307,577 | Downing | Jan. 5, 1943 |
| 2,373,570 | Keller | Apr. 10, 1945 |
| 2,850,461 | Bloch et al. | Sept. 2, 1958 |
| 2,922,831 | Bloch et al. | Jan. 26, 1960 |

OTHER REFERENCES

C. A., vol. 43; page 385B; January-March 1949.
Ind. Eng. Chem., vol. 42, pages 2479–89; 1950.